US012173889B1

(12) United States Patent
Zhu

(10) Patent No.: US 12,173,889 B1
(45) Date of Patent: Dec. 24, 2024

(54) COMBINED LAMP FAN

(71) Applicant: Xuebei Zhu, Hangzhou (CN)

(72) Inventor: Xuebei Zhu, Hangzhou (CN)

( * ) Notice: Subject to any disclaimer, the term of this patent is extended or adjusted under 35 U.S.C. 154(b) by 0 days.

(21) Appl. No.: 18/615,796

(22) Filed: Mar. 25, 2024

(30) Foreign Application Priority Data

Mar. 8, 2024 (CN) ......................... 202420455833.6

(51) Int. Cl.
*F21V 33/00* (2006.01)
*F04D 19/00* (2006.01)
*F04D 29/34* (2006.01)
*F21V 19/02* (2006.01)

(52) U.S. Cl.
CPC ........ *F21V 33/0096* (2013.01); *F04D 19/002* (2013.01); *F04D 29/34* (2013.01); *F21V 19/02* (2013.01)

(58) Field of Classification Search
None
See application file for complete search history.

(56) References Cited

U.S. PATENT DOCUMENTS 6,171,060 B1 1/2001 Gajewski
6,247,894 B1 6/2001 Moody et al.
6,309,083 B1 10/2001 Lathrop et al.
6,367,942 B1 4/2002 Bauer
11,761,454 B2 * 9/2023 Yao ........................ F04D 25/088 416/244 R
11,844,884 B2 * 12/2023 Sood .......................... A61L 9/20
2022/0008602 A1 * 1/2022 Sood .......................... A61L 9/20
2023/0235749 A1 * 7/2023 Yao .......................... F04D 29/34 416/244 R

* cited by examiner

*Primary Examiner* — Juan G Flores
(74) *Attorney, Agent, or Firm* — S.J. Intellectual Property LTD.

(57) ABSTRACT

Provided is a combined lamp fan. A main body frame includes a plurality of split frames, the plurality of split frames are arranged in a circumferential array around a preset center, and any two adjacent split frames are detachably connected; a fan component is detachably connected to the main body frame, the fan component includes a rotating piece and a plurality of fan blades, the plurality of fan blades are arranged uniformly around a rotating axis, and each of the fan blades is detachably connected to the rotating piece; and a plurality of lamp brackets are respectively arranged in the main body frame, and a lampholder on each of the lamp brackets is electrically connected to a bulb.

6 Claims, 9 Drawing Sheets

COMBINED LAMP FAN

CROSS-REFERENCE TO RELATED APPLICATIONS

The application claims priority to Chinese patent application No. 202420455833.6, filed on Mar. 8, 2024, the entire contents of which are incorporated herein by reference.

TECHNICAL FIELD

The present disclosure relates to the technical field of lighting and fan electronic products, and in particular to a combined lamp fan.

BACKGROUND

To meet use requirements, a lighting fan combining a lighting function with an air supply function and having lighting and blowing functions has appeared in the current market.

However, the fan product is integrated with the lighting function of a lamp, so that the finished product is oversized after being packaged. Taking the 20-cun finished product in the current market as an example, this type of product will have a size of 21 to 22 cun after being packaged, which will occupy a lot of space in the storage and transportation process, thereby increasing the storage and transportation costs.

Therefore, how to reasonably reduce the packaging size of these products to reduce the storage and transportation costs is an urgent technical problem to be solved at present.

SUMMARY

An objective of the present disclosure is to provide a combined lamp fan, and the packaging size of the combined lamp fan is reduced through a reasonable structural design, so that the storage and transportation costs are reduced.

To achieve the above objective, the present disclosure provides the following technical solution:

the present disclosure provides a combined lamp fan. The combined lamp fan includes: a main body frame, a fan component and a plurality of lamp brackets, where the main body frame includes a plurality of split frames, the plurality of split frames are arranged in a circumferential array around a preset center, and any two adjacent split frames are detachably connected; the fan component is located inside the main body frame and is detachably connected to the main body frame, the fan component includes a rotating piece and a plurality of fan blades, a rotating axis of the rotating piece coincides with the preset center, the plurality of fan blades are arranged uniformly around the rotating axis, and each of the fan blades is detachably connected to the rotating piece; and the plurality of lamp brackets are arranged in the main body frame and distributed uniformly around the rotating axis, each of the lamp brackets is connected to the main body frame, each of the lamp brackets includes a lampholder, and the lampholder is configured to be electrically connected to a bulb.

Further, any two adjacent split frames are respectively a first split frame and a second split frame, a first connecting piece is arranged on one side of the first split frame close to the second split frame, a first connecting groove matched with the connecting piece is formed in one side of the second split frame close to the first split frame, and the first split frame is capable of being detachably connected to the first connecting groove and the second split frame through the first connecting piece.

Further, one side of the first connecting groove is provided with a first mounting hole, and the first connecting piece corresponding to the first connecting groove is provided with a second mounting hole corresponding to the position of the first mounting hole; and when the first connecting piece is inserted into the corresponding first connecting groove, the first split frame and the second split frame are capable of being connected to the first mounting hole and the second mounting hole through first locking pieces.

Further, the rotating piece has a circumferential surface coaxial with the rotating axis thereof, the circumferential surface is provided with second connecting grooves in one-to-one correspondence with the plurality of fan blades, a second connecting piece is arranged at an end part of each of the fan blades close to the circumferential surface, and each of the fan blades is capable of being detachably connected to the rotating piece through the second connecting piece and the second connecting groove.

Further, one side of each of the second connecting grooves is provided with at least one limiting groove, and the second connecting piece corresponding to each of the second connecting grooves is provided with at least one protrusion limiting structure corresponding to the at least one limiting groove; and when the second connecting piece is inserted into the corresponding second connecting groove, the protrusion limiting structure is arranged in the corresponding limiting groove so as to limit a relative position between the second connecting piece and the second connecting groove.

Further, one side of the second connecting groove is provided with a third mounting hole, and the second connecting piece corresponding to the second connecting groove is provided with a fourth mounting hole corresponding to the position of the third mounting hole; and when the second connecting piece is inserted into the corresponding second connecting groove, the fan blades and the rotating piece are capable of being connected to the third mounting hole and the fourth mounting hole through second locking pieces.

Further, each of the lamp brackets further includes a mounting rod and a connecting rod, where one end of the mounting rod in an extending direction has a fifth mounting hole, a sixth mounting hole is formed inside each of the split frames facing one side of the preset center, and each mounting rod is capable of being detachably connected to the split frames through a threaded connection piece, the fifth mounting hole and the sixth mounting hole; and the connecting rod extends in a preset direction or a preset radian, and two ends of the connecting rod in an extending direction are respectively connected to the mounting rod and the lampholder.

Further, each of the lamp brackets further includes: a hinge piece, hinged to an end part of the mounting rod in an extending direction away from the fifth mounting hole, so that each mounting rod is capable of being hinged to the main body frame through the hinge piece.

Further, each of the lamp brackets further includes: a universal joint, rotatably connected to an end part of the mounting rod in an extending direction away from the fifth mounting hole, so that each mounting rod is capable of being rotatably connected to the main body frame through the universal joint.

According to the analysis, the present disclosure discloses a combined lamp fan. In the combined lamp fan, the main body frame and the fan component are detachably connected, the main body frame is formed by detachably combining the plurality of split frames, each of the fan blade of the fan and the rotating piece are detachably connected, and each of the lamp brackets is capable of being folded through the hinge piece or the universal joint. When the combined lamp fan is packaged, the main body frame and the fan component can be respectively disassembled to obtain the plurality of split frames, the plurality of fan blades and the rotating piece, each of the lamp brackets is folded, and packaging is performed through the plurality of split frames, the plurality of fan blades, the rotating piece and the folded lamp brackets, so that the space occupancy rate after packaging can be effectively reduced, thereby effectively reducing the storage and transportation costs.

BRIEF DESCRIPTION OF DRAWINGS

The drawings of the specification that constitute a part of the present application are used to provide a further understanding of the present disclosure. The exemplary embodiments of the present disclosure and the description thereof are used to explain the present disclosure, and do not constitute an improper limitation of the present disclosure. In the drawings.

DESCRIPTION OF REFERENCE NUMERALS OF THE DRAWINGS

Figure 1:
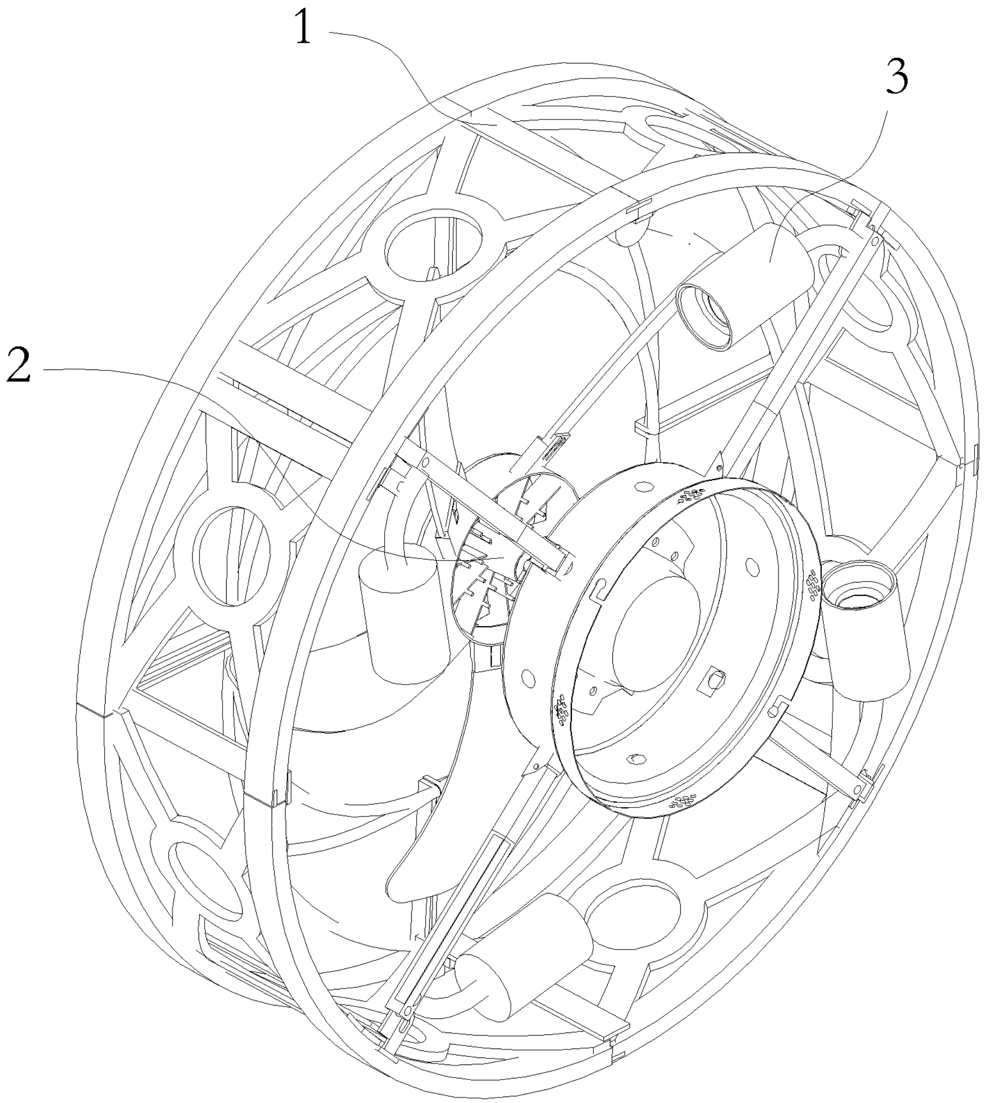
FIG. 1 is a structural schematic diagram of a combined lamp fan according to an embodiment of the present disclosure.
Figure 2:
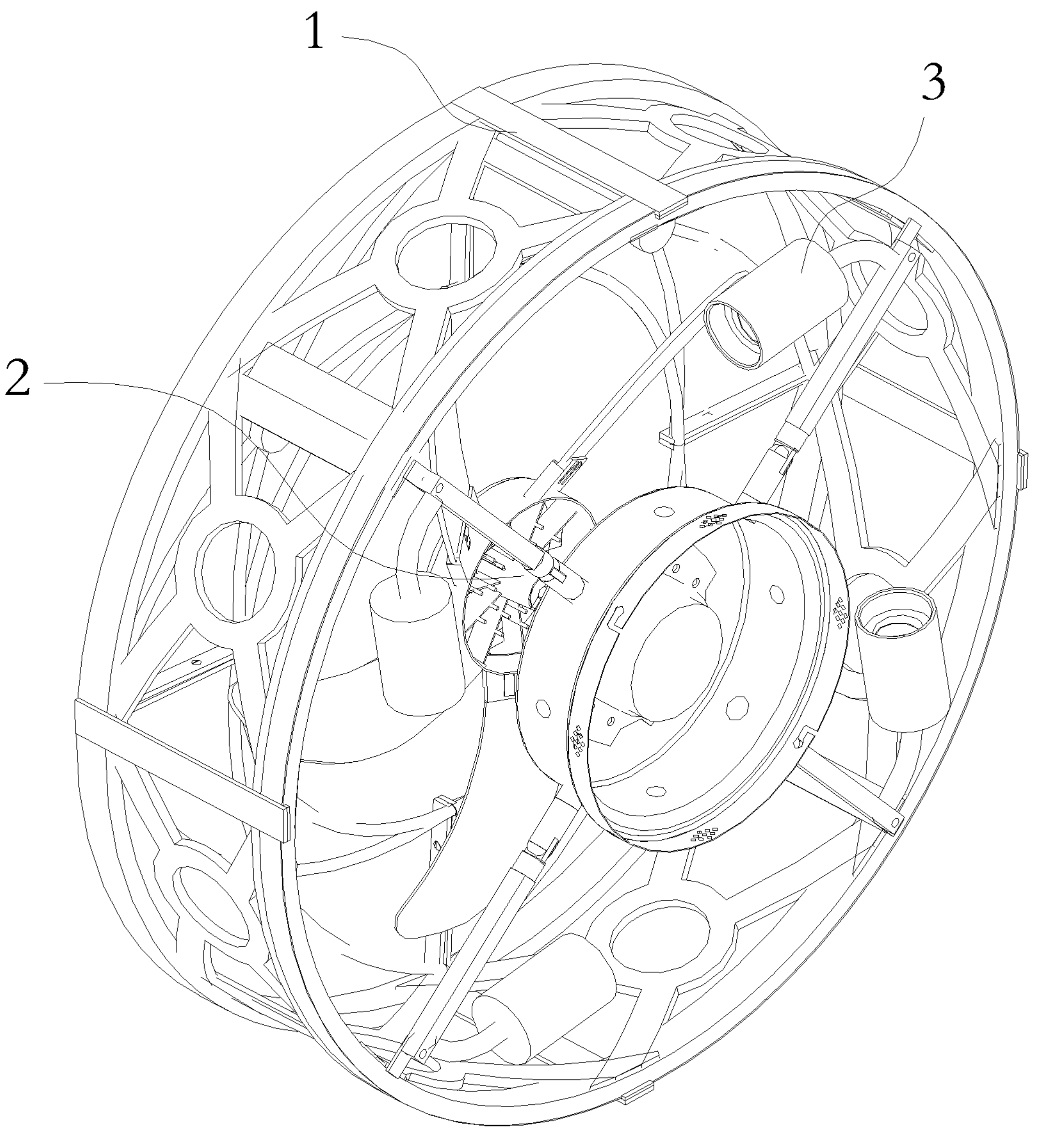
FIG. 2 is a structural schematic diagram of another combined lamp fan according to an embodiment of the present disclosure.
Figure 3:
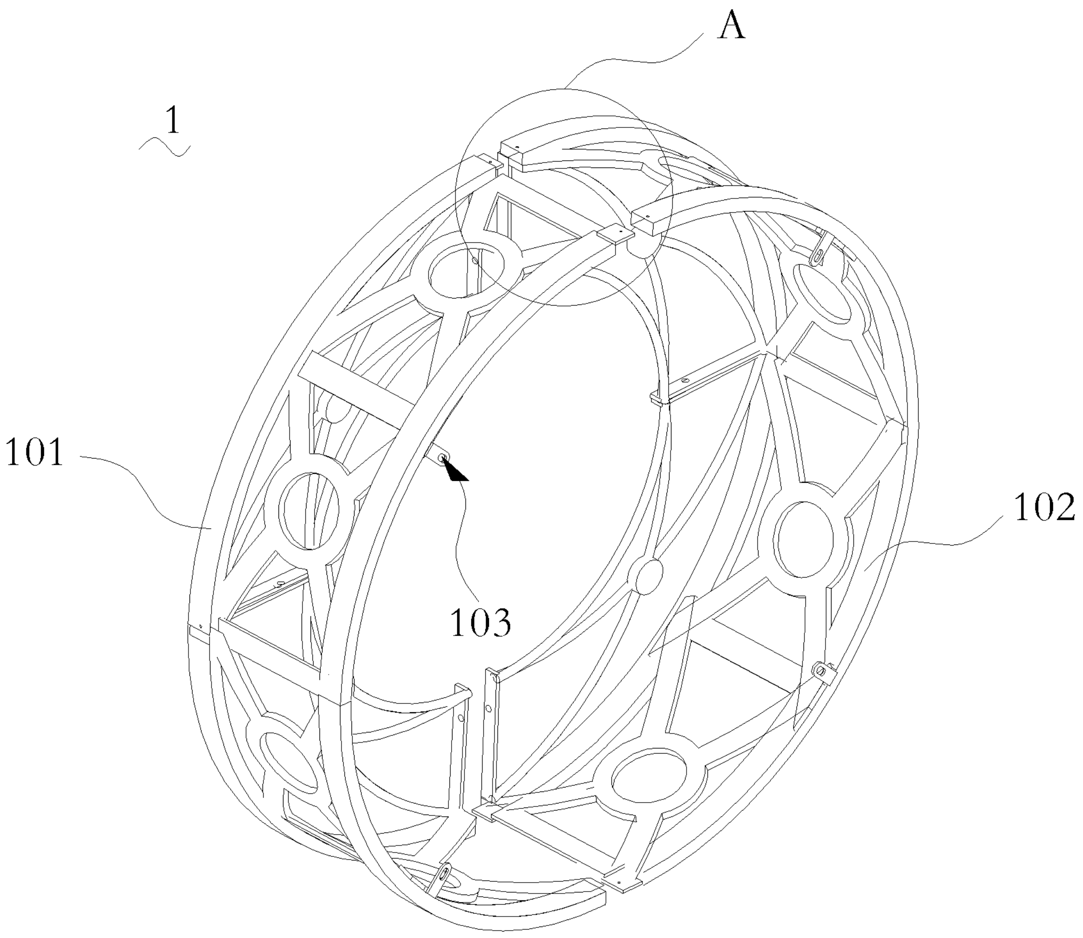
FIG. 3 is a schematic diagram of a disassembled structure of a main body frame of a combined lamp fan according to an embodiment of the present disclosure.

1. main body frame; 101. first split frame; 101*a*. first connecting piece; 101*b*. first mounting hole; 102. second split frame; 102*a*. first connecting groove; 102*b*. second mounting hole; 103. sixth mounting hole; 2. fan component; 201. rotating piece; 201*a*. circumferential surface; 201*b*. second connecting groove; 201*c*. limiting groove; 201*d*. third mounting hole; 202. fan blade; 202*a*. second connecting piece; 202*b*. protrusion limiting structure; 202*c*. fourth mounting hole; 3. lamp bracket; 301. lampholder; 302. mounting rod; 302*a*. fifth mounting hole; 303. connecting rod; 304. hinge piece; 305. universal joint.

DETAILED DESCRIPTION OF THE EMBODIMENTS

The present disclosure will be described in detail below with reference to the accompanying drawings and in conjunction with embodiments. Various examples are provided by way of interpretation of the present disclosure and are not intended to limit the present disclosure. Indeed, it will be apparent to those skilled in the art that modifications and variations may be made in the present disclosure without departing from the scope or spirit of the present disclosure. For example, features shown or described as part of one embodiment may be used in another embodiment to produce yet another embodiment. Therefore, it is desirable that the present disclosure includes such modifications and variations falling within the scope of the appended claims and their equivalents.

In the description of the present disclosure, the terms "longitudinal", "transverse", "up", "down", "front", "back", "left", "right", "vertical", "horizontal", "top", "bottom" and the like denote orientation or positional relationships based on those shown in the drawings and are intended for ease of description only and not to require that the present disclosure is necessarily constructed and operated in a particular orientation and thus cannot be construed as a limitation to the present disclosure. The terms "connection", "connect" and "set" used in the present disclosure should be understood in a broad sense, for example, which may refer to a fixed connection or a detachable connection; which may refer to a direct connection or an indirect connection through intermediate components; which may refer to a wired electrical connection, a radio connection, or a wireless communication signal connection, and the specific meanings of the above terms may be understood by those of ordinary skill in the art according to a specific situation.

One or more examples of the present disclosure are shown in the accompanying drawings. The detailed description uses numeric and letter marks to refer to features in the drawings. Similar or like reference signs in the drawings and descriptions have been used to refer to similar or like parts of the present disclosure. As used herein, the terms "first", "second" and "third" and the like are used interchangeably to distinguish one member from another and are not intended to denote the location or importance of individual members.

As shown in FIG. 1 to FIG. 9, according to the embodiments of the present disclosure, a combined lamp fan is provided. The combined lamp fan includes: a main body frame 1, a fan component 2 and four lamp brackets 3, where the main body frame 1 includes two split frames, the two split frames are respectively a first split frame 101 and a second split frame 102, and the first split frame 101 and the second split frame 102 are detachably connected; the fan component 2 is located inside the main body frame 1 and is detachably connected to the main body frame 1, the fan component 2 includes a rotating piece 201 and five fan blades 202, a rotating axis of the rotating piece 201 coincides with the preset center, the five fan blades 202 are arranged uniformly around the rotating axis, and each of the fan blades 202 is detachably connected to the rotating piece 201; and the five lamp brackets 3 are arranged in the main body frame 1 and distributed uniformly around the rotating axis, each of the lamp brackets 3 is connected to the main body frame 1, each of the lamp brackets 3 includes a lampholder 301, and the lampholder 301 is configured to be electrically connected to a bulb.

Optionally, in some embodiments of the combined lamp fan provided by the present disclosure, the number of the split frames may be two or more, each of the split frames may be of a fan-shaped structure or an isosceles triangle structure, so that the plurality of split frames can be combined into a circular or a polygonal main body frame 1.

Figure 4:
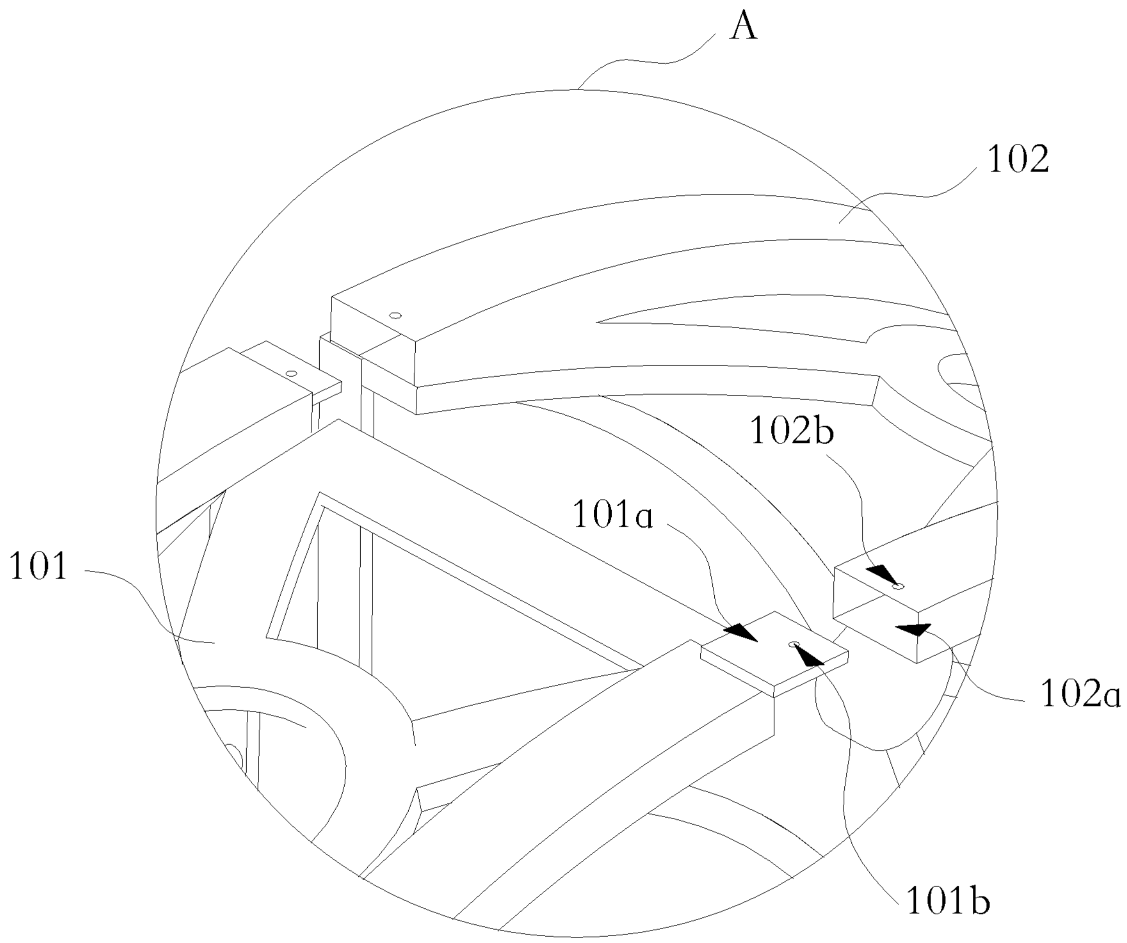
FIG. 4 is a schematic diagram of a partially enlarged structure of a structure of a part A in FIG. 3.
Figure 5:
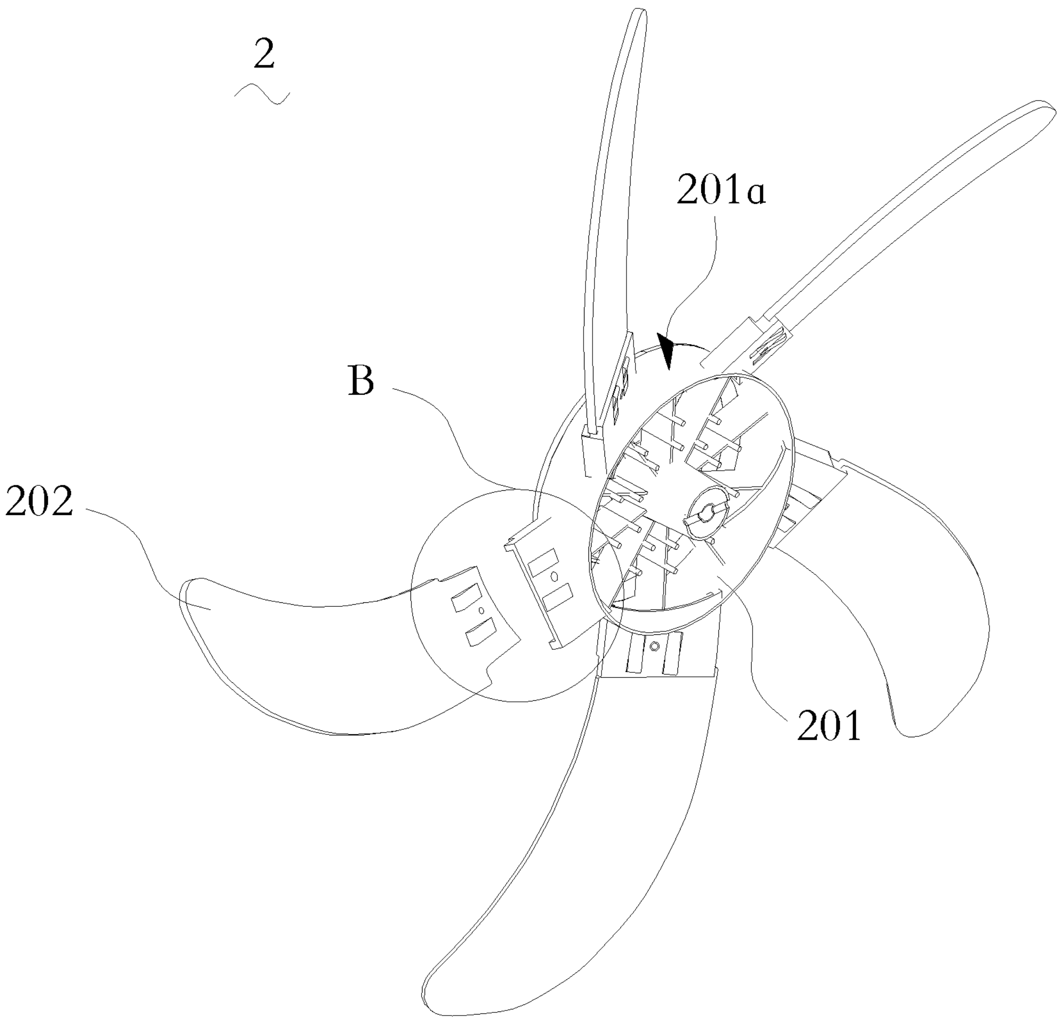
FIG. 5 is a schematic diagram of a disassembled structure of a fan component of a combined lamp fan according to an embodiment of the present disclosure.

Specifically, in this embodiment, the main body frame 1 is formed by combining the first split frame 101 and the second split frame 102 which are semi-circular. A corresponding first connecting piece 101*a* and a corresponding first connecting groove 102*a* are respectively arranged at a position where the first split frame 101 and the second split frame 102 are connected. As illustrated in FIG. 4, the first connecting piece 101*a* is a first protrusion. The first connecting piece 101*a* can be inserted into the corresponding first connecting groove 102*a*, so that the first split frame 101 and the second split frame 102 can be detachably connected.

Preferably, to enhance the connection stability of the first split frame 101 and the second split frame 102, a first mounting hole 101*b* is formed at the first connecting groove 102*a*, and a second mounting hole 102*b* is formed at the first connecting piece 101*a*; and after the first split frame 101 and the second split frame 102 are inserted and combined through the first connecting piece 101*a* and the first connecting groove 102*a*, the first mounting hole 101*b* and the second mounting hole 102*b* can be locked simultaneously through a threaded connection piece, so that the first split frame 101 and the second split frame 102 can be prevented from being separated.

Optionally, in some embodiments of the combined lamp fan provided by the present disclosure, the number of the fan blades 202 in the fan component 2 may be two or more.

Figure 6:
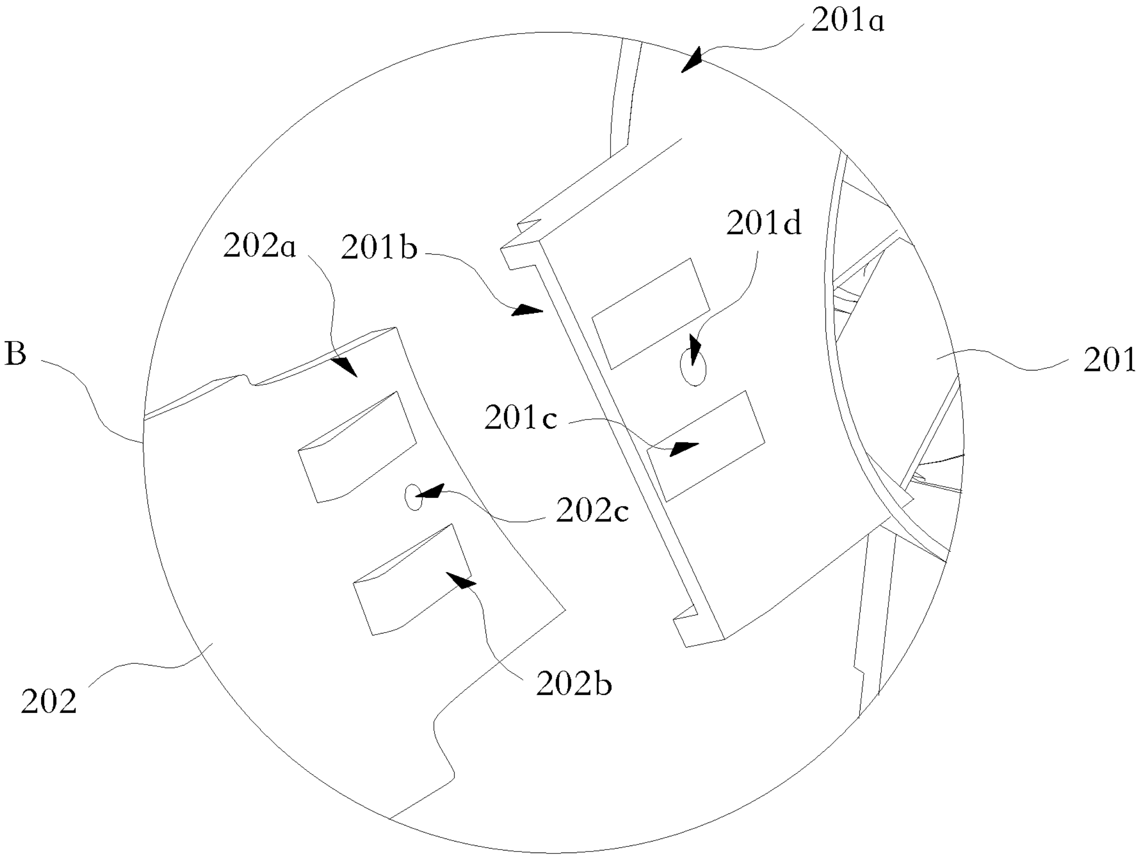
FIG. 6 is a schematic diagram of a partially enlarged structure of a structure of a part B in FIG. 5.
Figure 7:
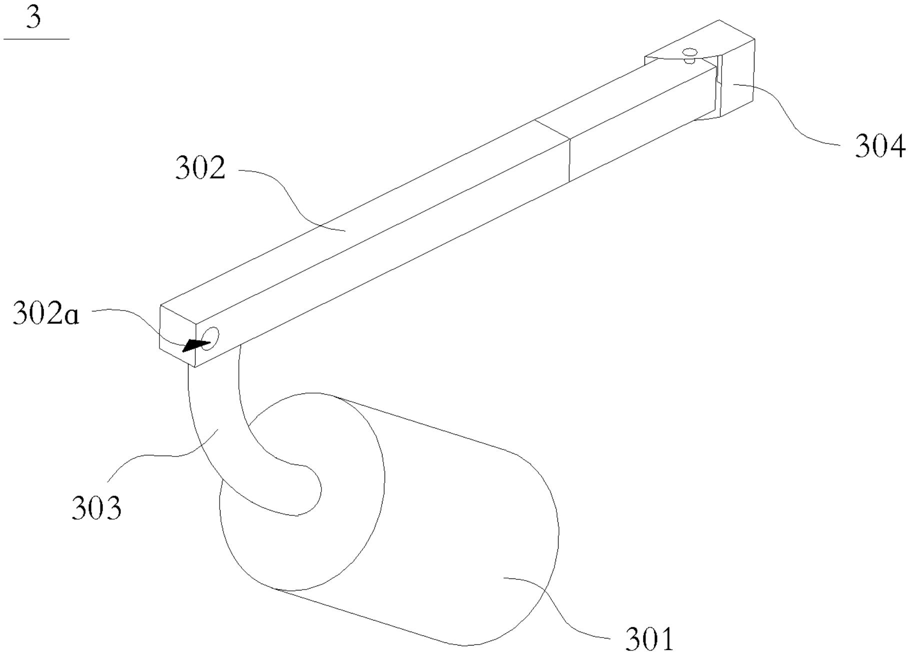
FIG. 7 is a structural schematic diagram of a first lamp bracket of a combined lamp fan according to an embodiment of the present disclosure.
Figure 8:
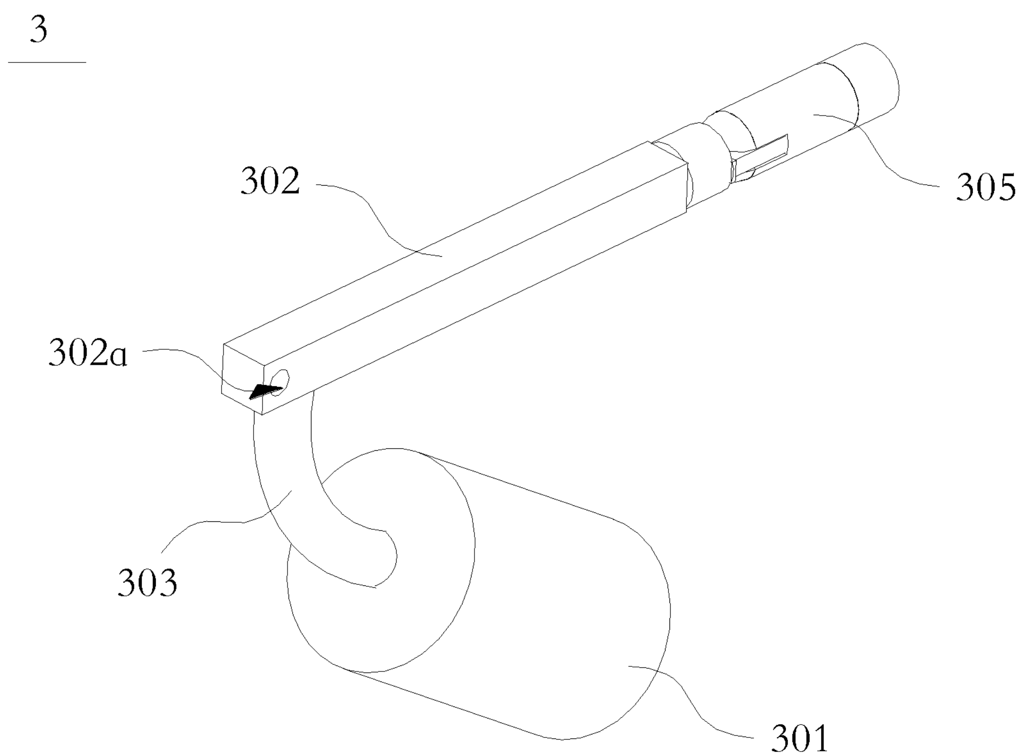
FIG. 8 is a structural schematic diagram of a second lamp bracket of a combined lamp fan according to an embodiment of the present disclosure.
Figure 9:
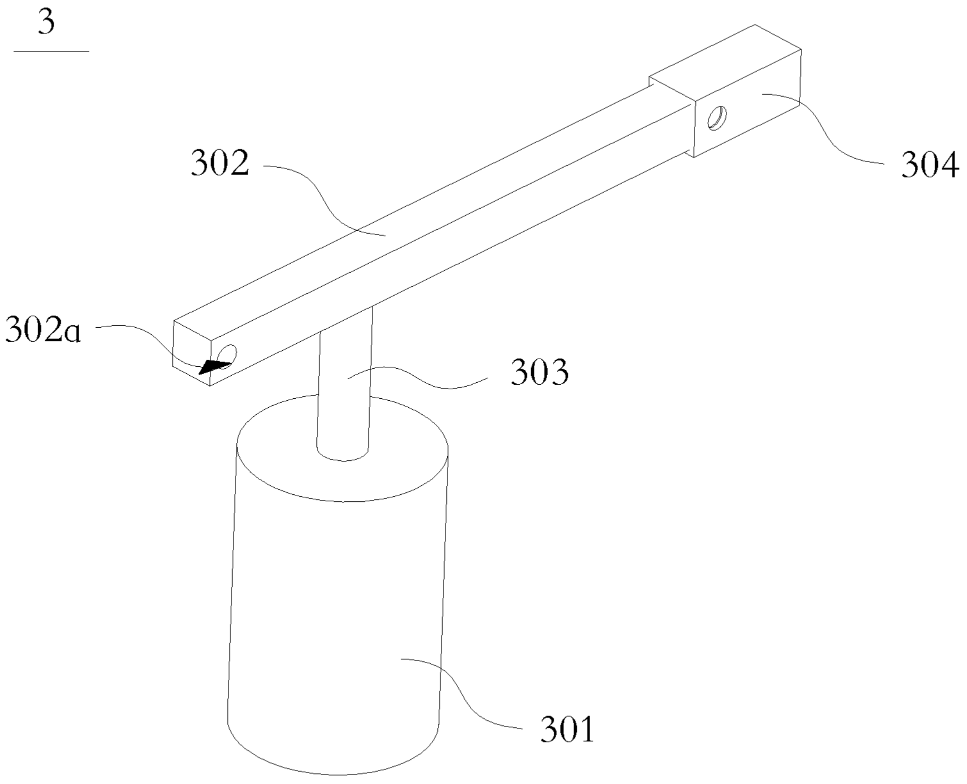
FIG. 9 is a structural schematic diagram of a third lamp bracket of a combined lamp fan according to an embodiment of the present disclosure.

Specifically, in this embodiment, the rotating piece 201 in the fan component 2 is cylindrical and has a circumferential surface 201*a*, the number of the fan blades 202 is five, the circumferential surface 201*a* of the rotating piece 201 is provided with five second connecting grooves 201*b* corresponding to the five fan blades 202, and a second connecting piece 202*a* is arranged at an end part of each of the fan blades 202 close to the rotating piece 201, so that the five fan blades 202 can be respectively and correspondingly inserted into the five second connecting grooves 201*b* in the circumferential surface 201*a* of the rotating piece 201, and the fan blades 202 and the rotating piece can be detachably connected. As illustrated in FIG. 6, the second connecting piece 202*a* is a second protrusion.

Preferably, to enhance the connection stability of each of the fan blades 202 and the rotating piece 201, each of the second connecting grooves 201*b* is provided with two limiting grooves 201*c*, a third mounting hole 201*d* is formed between the two limiting grooves 201*c* at each of the second connecting grooves 201*b*, two protrusion limiting structures 202*b* are arranged at the second connecting piece 202*a* of each of the fan blades 202 corresponding to the limiting grooves 201*c*, and a fourth mounting hole 202*c* corresponding to the third mounting hole 201*d* is formed between the two protrusion limiting structures 202*b* at each of the second connecting pieces 202*a*. When each of the fan blades 202 is inserted into the second connecting groove in the rotating piece 201 corresponding to the second connecting groove 201*b* through the second connecting piece 202*a*, the two protrusion limiting structures 202*b* at the second connecting piece 202*a* may be respectively embedded in the corresponding limiting grooves 201*c*, so that a relative position between each of the fan blades 202 and the rotating piece 201 is limited. Finally, each of the fan blades 202, and the third mounting hole 201*d* and the fourth mounting hole 202*c* at the corresponding second connecting groove 201*b* can be locked through the threaded connection piece, so that the fan blades 202 and the rotating piece 201 can be prevented from being separated.

Specifically, each of the lamp brackets 3 includes a lampholder 301, a mounting rod 302 and a connecting rod 303, the lampholder 301 is fixed at the mounting rod 302 through the connecting rod 303, and one end of the mounting rod 302 is provided with a fifth mounting hole 302*a*. In this embodiment, inner walls of outer rings of the first split frame 101 and the second split frame 102 are respectively provided with two sixth mounting holes 103, the number of the lamp brackets 3 is four, and the first split frame 101 and the second split frame 102 are detachably connected to the fifth mounting holes 302*a* in the mounting rods 302 of the two lamp brackets 3 respectively through two sixth mounting holes 103 and the threaded connection piece, so that the mounting rod 302 of each of the lamp brackets 3 is detachably connected to the main body frame 1.

Preferably, an end part of the mounting rod 302 of each of the lamp brackets 3 in an extending direction away from the fifth mounting hole 302*a* is connected to a hinge piece 304 or a universal joint 305, so that the other end of the mounting rod 302 of each of the lamp brackets 3 may be rotatably connected to a middle frame of the main body frame 1, and each of the lamp brackets 3 has a folding function.

Optionally, the connecting rod 303 may be a straight rod extending in a preset direction and having an included angle with the mounting rod 302, or the connecting rod 303 may be a curved rod extending in a preset radian.

From the above description, it can be seen that the above embodiment of the present disclosure achieves the following technical effects:

Compared with the prior art, according to the combined lamp fan provided by the embodiments of the present invention, the main body frame 1 and the fan component 2 are detachably connected, the main body frame 1 is formed by detachably combining the plurality of split frames, each of the fan blades 202 of the fan is detachably connected to the rotating piece 201, and each of the lamp brackets 3 may be folded through the hinge piece 304 or the universal joint 305. When the combined lamp fan is packaged, the main body frame 1 and the fan component 2 can be disassembly to obtain the plurality of split frames, the plurality of fan blades 202 and the rotating piece 201, each of the lamp brackets 3 is folded, and packaging is performed through the plurality of split frames, the plurality of fan blades 202, the rotating piece 201 and the folded lamp brackets 3, so that the space occupancy rate after packaging can be effectively reduced, thereby effectively reducing the storage and transportation costs.

The foregoing is merely a preferred embodiment of the present disclosure and is not intended to limit the present disclosure which may be subject to various modifications and variations to those skilled in the art. Any modification, equivalent replacement, improvement, etc. made within the spirit and principles of the present disclosure should be included in the scope of protection of the present disclosure.

What is claimed is:

1. A combined lamp fan, comprising:

a main body frame, comprising a plurality of split frames, the plurality of split frames being arranged in a circumferential array around a preset center, and any two adjacent split frames being detachably connected;

a fan component, located inside the main body frame, detachably connected to the main body frame and comprising a rotating piece and a plurality of fan blades, a rotating axis of the rotating piece coinciding with the preset center, the plurality of fan blades being arranged uniformly around the rotating axis, and each of the fan blades being detachably connected to the rotating piece; and a plurality of lamp brackets, respectively arranged in the main body frame and distributed uniformly around the rotating axis, each of the lamp brackets being connected to the main body frame, each of the lamp brackets comprising a lampholder, and the lampholder being configured to be electrically connected to a bulb;

wherein any two adjacent split frames are respectively a first split frame and a second split frame, a first connecting piece is arranged on one side of the first split frame, a first connecting groove matched with the first connecting piece is formed in one side of the second split frame, the first connecting piece faces the first connecting groove, the first connecting piece is a first protrusion and the first split frame is capable of being detachably connected to the first connecting groove and the second split frame through the first connecting piece.

2. The combined lamp fan according to claim 1, wherein the rotating piece has a circumferential surface coaxial with the rotating axis thereof, the circumferential surface is provided with second connecting grooves in one-to-one correspondence with the plurality of fan blades, a second connecting piece is arranged at an end part of each of the fan blades, the second connecting piece faces a corresponding second connecting groove, the second connecting piece is a second protrusion and each of the fan blades is capable of being detachably connected to the rotating piece through the second connecting piece and the second connecting groove.

3. The combined lamp fan according to claim 2, one side of each of the second connecting grooves is provided with at least one limiting groove, and the second connecting piece corresponding to each of the second connecting grooves is provided with at least one protrusion limiting structure corresponding to the at least one limiting groove; and when the second connecting piece is inserted into the corresponding second connecting groove, the at least one protrusion limiting structure is arranged in the corresponding limiting groove so as to limit a relative position between the second connecting piece and the corresponding second connecting groove.

4. The combined lamp fan according to claim 2, wherein each of the lamp brackets further comprises:

a mounting rod, one end of the mounting rod in an extending direction having a fifth mounting hole, corresponding sixth mounting holes being formed inside each of the split frames facing one side of the preset center, and each mounting rod being capable of being detachably connected to the split frames through a threaded connection piece, the fifth mounting hole and the corresponding sixth mounting hole; and a connecting rod, extending in a preset direction or a preset radian, two ends of the connecting rod in an extending direction being respectively connected to the mounting rod and the lampholder.

5. The combined lamp fan according to claim 4, wherein each of the lamp brackets further comprises:

a hinge piece, hinged to an end part of the mounting rod in the extending direction away from the fifth mounting hole, so that each mounting rod is capable of being hinged to the main body frame through the hinge piece.

6. The combined lamp fan according to claim 4, wherein each of the lamp brackets further comprises:

a universal joint, rotatably connected to the end part of the mounting rod in the extending direction away from the fifth mounting hole, so that each mounting rod is capable of being rotatably connected to the main body frame through the universal joint.

* * * * *